United States Patent [19]

Aonuma et al.

[11] Patent Number: 4,885,341
[45] Date of Patent: Dec. 5, 1989

[54] RUBBER COMPOSITION

[75] Inventors: Mitsuyoshi Aonuma, Tokyo; Nagatoshi Sugi, Yokohama, both of Japan

[73] Assignee: Nippon Zeon Co., Ltd., Tokyo, Japan

[21] Appl. No.: 212,788

[22] Filed: Jun. 29, 1988

[30] Foreign Application Priority Data

Jun. 29, 1987 [JP] Japan ............................ 62-161466

[51] Int. Cl.$^4$ .................... C08L 15/02; C08L 23/34; C08L 9/00; C08L 23/28
[52] U.S. Cl. ............................. 525/187; 525/232; 525/194; 525/192
[58] Field of Search .............. 525/232, 187, 192, 194

[56] References Cited

U.S. PATENT DOCUMENTS

| 3,081,279 | 3/1963 | Hammel et al. | 525/194 |
| 4,262,098 | 4/1981 | Onizawa | 525/187 |
| 4,607,074 | 8/1986 | Hazelton et al. | 525/232 |

*Primary Examiner*—Carman J. Seccuro
*Attorney, Agent, or Firm*—Sherman and Shalloway

[57] ABSTRACT

A rubber composition comprising 20 to 70% by weight of a first rubber component which is butyl rubber, a halogenated butyl rubber or a mixture of both as a first rubber component and 80 to 30% by weight of a second rubber component which is at least one rubber selected from chlorinated polyethylene rubber, chlorosulfonated polyethylene rubber and epichlorohydrin rubber, the first rubber component being dispersed as crosslinked rubber particles in the second rubber component.

4 Claims, No Drawings

RUBBER COMPOSITION

This invention relates to a rubber composition capable of giving a vulcanizate which has resistance to permeation of fluorine-containing organic compound gases and well-balanced mechanical properties. More specifically, this invention relates to a rubber composition which is suitable for production of flexible parts in a device handling fluorine-containing organic solvents and the like.

In recent years, fluorine-containing refrigerant R-12 widely used in refrigerating systems such as an automobile cooler was considered as one factor of destroying the ozone layer of the stratosphere, and worldwide investigations got under way on the use of R-22 and R-133 as substitute refrigerants.

In conventional refrigerating systems using R-12 as a refrigerant, oil-resistant rubbers such as nitrile rubber (NBR) have generally been used at that part of an inner hose tube material for the refrigerant or a seal which makes contact with the refrigerant gas. But in new refrigerating systems using R-22 or R-134 as a refrigerant, such oil-resistant rubbers cannot withstand use because they are highly permeable to refrigerant gases. It has been desired therefore to develop a new rubber material.

It is an object of this invention to provide a rubber composition capable of giving a vulcanizate having low permeability to fluorine-containing refrigerant gases and well balanced mechanical properties.

The present inventors have studied various rubber blends in order to achieve this object, and found that a composition composed of two specific rubber components in which one rubber component is dispersed as dynamically vulcanized particles in the other rubber component has excellent processability and gives a vulcanizate having improved resistance to permeation to refrigerant gases and excellent mechanical strength not obtainable by an ordinary rubber blend of the two rubber components (not subjected to dynamic vulcanization).

Thus, according to this invention, there is provided a rubber composition comprising 20 to 70% by weight of a first rubber component which is butyl rubber, a halogenated butyl rubber or a mixture of both as a first rubber component and 80 to 30% by weight of a second rubber component which is at least one rubber selected from chlorinated polyethylene rubber, chlorosulfonated polyethylene rubber and epichlorohydrin rubber, the first rubber component being dispersed as crosslinked rubber particles in the second rubber component.

The butyl rubber used as the first rubber component in this invention is an isobutylene/isoprene copolymer rubber (IIR) usually having a degree of unsaturation of 0.5 to 2.5 mole %. Examples of the halogenated butyl rubber are chlorinated butyl rubber (CIIR) and brominated butyl rubber (BrIIR) obtained by chlorinating and brominating the butyl rubber respectively.

The chlorinated polyethylene rubber (CPE) as the second rubber component in this invention is obtained by chlorinating polyethylene to a chlorine content of usually 30 to 45% by weight. The chlorosulfonated polyethylene rubber (CSM) is obtained by reacting polyethylene with chlorine and sulfur dioxide. The epichlorohydrin rubber may be, for example, a homopolymer (CO) of epichlorohydrin, an epichlorohydrin/ethylene oxide copolymer rubber (ECO), an epichlorohydrin/allyl glycidyl ether copolymer rubber, an epichlorohydrin/ethylene oxide/allyl glycidyl ether terpolymer rubber (ETCO), or an epichlorohydrin/propylene oxide/allyl glycidyl ether terpolymer rubber. One or more of these rubbers may be used as the second rubber component.

The rubber composition of this invention consists essentially of 20 to 70% by weight of the first rubber component and 80 to 30% by weight of the second rubber component. If the proportion of the first rubber component exceeds 70% by weight, the resulting composition has poor processability. If it is below 20% by weight, the composition has poor resistance to permeation to fluorinecontaining refrigerant gases. Preferably, the rubber composition consists essentially of 35 to 65% by weight of the first rubber component and 65 to 35% by weight of the second rubber component.

The characteristic feature of the rubber composition provided by this invention is that the first rubber component is dispersed as crosslinked rubber particles in the second rubber component. Because of this mixed state of the rubber components, the composition of this invention can give a vulcanizate having improved resistance to permeation to refrigerant gases and excellent strength properties. The effect of this invention cannot be obtained by simply mixing the rubber components of the invention by a conventional blending technique, and vulcanizing the mixture in the presence of a vulcanizer.

There is no particular restriction on the particle diameter, shape, form and degree of crosslinking of the dispersed crosslinked rubber particles of the first rubber component. To achieve the object of this invention, the dispersed particles preferably have a particle diameter of not more than 5 microns ($\mu$m) and a gel content, as a measure of the degree of crosslinking, of at least 95%. Desirably, the dispersed particles do not form agglomerated masses in the second rubber component phase. The gel content, used here, denotes the content in % by weight of an insoluble component insoluble in a solvent which dissolves only the first rubber component and does not dissolve the second rubber component, or the content in % by weight of an insoluble component in the first rubber component determined by separating the first rubber component from a solution of the rubber composition in a solvent capable of dissolving both the first and second rubber components, weighing the separated soluble first rubber component, and calculating the amount of the insoluble component.

The rubber composition of this invention can be produced, for example, by blending the second rubber component with a powder of the crosslinked first rubber component; blending the second component as a latex with a latex of the crosslinked first rubber component, and thereafter dehydrating and drying the blend; or vulcanizing the first rubber component dynamically in the presence of the second component. Blending of the crosslinked rubber powder may be accomplished by kneading a crosslinked rubber powder (obtained by vulcanizing the first rubber component with kneading), or a crosslinked rubber powder obtained from a crosslinked emulsion or suspension of the first rubber component, with the second rubber component.

An especially preferred procedure for dynamic vulcanization is to vulcanize the first component in the presence of a vulcanizer capable of vulcanizing the first rubber component but incapable of vulcanizing the second rubber component while the first and second rubber components are mixed in a mixer. Dynamic vulcanization may be carried out in a closed kneader or a mixing extruder such as a Banbury mixer, a Brabender mixer, a kneader or a twin-screw extruder normally used for rubber mastication or mixing. Use of a kneader having a high shearing force is effective for reducing the size of the dispersed crosslinked rubber particles, and desirable for imparting superior properties. In order to vulcanize only the first rubber component without vulcanizing the second rubber component in dynamic vulcanization, different vulcanizing agents should be selected depending upon the type of the second rubber component. There is no particular limitation on vulcanizers used for dynamic vulcanization of the first rubber component. Quinoid vulcanizing agents such as p-quienonedioxime can be most widely used irrespective of the type of the second rubber component. When the second rubber component is chlorinated polyethylene rubber, sulfur vulcanizer systems and sulfur donor vulcanizers used ordinarily for butyl rubber and halogenated butyl rubbers may be used. When the second rubber component is the epichlorohydrin rubber, phenolic resin vulcanizing systems such as methylolated alkylphenol formaldehyde resins may be used. These vulcanizing agents are usually added to rubbers being kneaded. By prescribing the kneading temperature at the vulcanization temperature of the first rubber component, the first rubber component is dispersed as crosslinked rubber particles in the second rubber component.

The rubber composition of this invention is further mixed with compounding chemicals by an ordinary mixer, and can be molded into a desired shape by an ordinary rubber molding machine such as a roll, a compression molding machine, an extruder and an injection molding machine.

The compounding chemicals used in this invention may include vulcanizers (for the second rubber component), reinforcing agents, fillers, plasticizers, softening agents, processing aids and antioxidants which are normally used in the rubber industry. The specific types and amounts of the compounding chemicals can be properly determined according to the end use of the rubber composition.

Thus, the invention provides a rubber composition having better moldability than those of conventional rubber compositions obtained by a conventional blending method and gives a vulcanizate having improved resistance to permeation to fluorine-containing refrigerant gases and improved strength properties.

The rubber composition of this invention is suitable for production of tires, hoses, seals, gaskets, belts, boots, rolls, and various rubber products requiring resistance to permeation of various gaseous components, by molding and vulcanization. It is also useful as a blend with a polyamide resin, a polyester resin, or the like for producing various products.

The following Examples, Comparative Examples and Referential Examples illustrate the present invention more specifically. Unless otherwise specified, all parts and percentages in these examples are by weight.

EXAMPLES 1–4

In accordance with the compounding recipe for Referential Example 1 shown in Table 1, chlorinated butyl rubber (Chlorobutyl 1066, a product of Exxon Company) and all the compounding chemicals were mixed on a roll to prepare a rubber compound I.

One hundred parts of chlorinated polyethylene rubber (ELASLEN 301A, a product of Showa Denko Co., Ltd.), 40 parts of SRF carbon black, 20 parts of FEF carbon black and 10 parts of magnesium oxide were mixed to prepare a rubber compound II.

A rubber compound III was prepared in the same way as in the preparation of the rubber compound II except that chlorosulfonated polyethylene rubber (HYPALON 40S, a product of E. I. du Pont de Nemours & Co.) was used as the rubber and the amount of magnesium oxide was changed to 5 parts. The rubber compound I and the rubber compound II or III were put in a Brabender mixer (rotating speed 100 rpm) at 160° C. so that the mixing ratio of the rubbers was as indicated in Table 1 for each of Examples 1 to 4 and the total amount of the rubbers reached 100 parts. They were mixed and subjected to dynamic vulcanization. In about 2 to 3 minutes after starting the kneading, the Brabender torque began to rise and reached a maximum in about 8 to 10 minutes. The mixing was stopped after the lapse of 18 minutes.

The compounded rubber composition was mixed further with vulcanizers for chlorinated polyethylene rubber (ethylenethiourea and sulfur) for Examples 1 and 2 or vulcanizers for chlorosulfonated polyethylene rubber (pentaerythritol, tetramethylthiuram disulfide and sulfur) for Examples 3 and 4 in the amounts indicated in Table 1.

After the mixing, the compounded rubber composition was formed into a sheet by a roll, and its processability was evaluated by the smoothness of the surface of the resulting sheet.

The composition was press-cured at 160° C. for 30 minutes, and the vulcanizate was subjected to a tensile test in accordance with JIS K-6301.

The amount of a fluorine-containing refrigerant gas permeated was determined by the following procedure. About 10 g of R-22 was injected into a permeation cell made of stainless steel (SUS-304) and having an inner capacity of 20.3 ml. The cell was then sealed up with the above vulcanized sheet (thickness 0.6 mm, diameter 38.5 mm) supported on a gas-permeable porous metallic plate. After standing at 30° C. for 24 hours, the amount of the refrigerant gas permeated was calculated on the basis of the change in the amount of R-22.

The results are shown in Table 1.

COMPARATIVE EXAMPLES 1–4

Compounded rubber compositions in Comparative Examples 1 and 2 were prepared by performing dynamic vulcanization in the same way as in Examples 1 to 4.

Compounded rubber compositions in Comparative Examples 3 and 4 were prepared by mixing chlorinated butyl rubber, chlorinated polyethylene rubber (or chlorosulfonated polyethylene rubber) and the compounding chemicals on a roll in accordance with the compounding recipes shown in Table 1.

The compositions in Comparative Examples had poor processability and could not be formed into a sheet by a roll, and therefore, the properties of its vulcanizate could not be evaluated.

The compositions of Comparative Examples 3 and 4 were each press-cured at 160° C. for 30 minutes, and the properties of the resulting vulcanizate were evaluated. The results are shown in Table 1.

REFERENTIAL EXAMPLES 1–4

Compounded rubber compositions were prepared, and the properties of vulcanizates prepared from them were evaluated, in the same way as in Comparative Examples 3 and 4. The results are shown in Table 1. The nitrile rubber used in Referential Example 4 was NIPOL DN206 produced by Nippon Zeon Co., Ltd.

The rubber compound V and the rubber compound I in Examples 1 to 4 were mixed and dynamically vulcanized by a Brabender mixer to that the ratio of the rubbers was as indicated in Examples 5 to 7 in Table 2

TABLE 1

| Compounding recipe and test results | Example 1 | 2 | 3 | 4 | Comparative Example 1 | 2 | 3 | 4 | Feferential Example 1 | 2 | 3 | 4 |
|---|---|---|---|---|---|---|---|---|---|---|---|---|
| Compounding recipe | | | | | | | | | | | | |
| Chlorinated butyl rubber | 40 | 70 | 40 | 70 | 80 | 80 | 40 | 40 | 100 | | | |
| Chlorinated polyethylene rubber | 60 | 30 | | | 20 | | 60 | | | 100 | | |
| Chlorosulfonated polyethylene rubber | | | 60 | 30 | | 20 | | 60 | | | 100 | |
| Nitrile rubber | | | | | | | | | | | | 100 |
| SRF carbon black | 40 | 40 | 40 | 40 | 40 | 40 | 40 | 40 | 40 | 40 | 40 | 40 |
| FEF carbon black | 20 | 20 | 20 | 20 | 20 | 20 | 20 | 20 | 20 | 20 | 20 | 20 |
| Magnesium oxide | 6.4 | 3.7 | 3.4 | 2.2 | 2.8 | 1.8 | 6.4 | 3.4 | 1 | 10 | 5 | |
| Zinc oxide | 2 | 3.5 | 2 | 3.5 | 4 | 4 | 2 | 2 | 5 | | | 5 |
| Stearic acid | 0.4 | 0.7 | 0.4 | 0.7 | 0.8 | 0.8 | 0.4 | 0.4 | 1 | | | 1 |
| Pentaerythritol | | | 1.8 | 0.9 | | 0.6 | | 1.8 | | | 3 | |
| Ethylenethiourea | 1.8 | 0.9 | | | 0.6 | | 1.8 | | | 3 | | |
| Tetramethyl thiuram disulfide | 0.4 | 0.7 | 1.6 | 1.3 | 0.8 | 1.2 | 0.4 | 1.6 | 1 | | 2 | 1 |
| Dibenzothiazyl disulfide | 0.4 | 0.7 | 0.4 | 0.7 | 0.8 | 0.8 | 0.4 | 0.4 | 1 | | | 2 |
| Sulfur | 0.3 | 0.15 | 0.6 | 0.3 | 0.1 | 0.2 | 0.3 | 0.6 | | 0.5 | 1 | 0.5 |
| Dynamic vulcanization conditions (°C.) | 160 | 160 | 160 | 160 | 160 | 160 | — | — | — | — | — | — |
| (min.) | 18 | 18 | 18 | 18 | 18 | 18 | — | — | — | — | — | — |
| Press-curing Conditions (°C.) | 160 | 160 | 160 | 160 | — | — | 160 | 160 | 160 | 160 | 160 | 160 |
| (min.) | 30 | 30 | 30 | 30 | — | — | 30 | 30 | 30 | 30 | 30 | 15 |
| Tensile test | | | | | | | | | | | | |
| Tensile strength (kg/cm$^2$) | 176 | 122 | 169 | 117 | — | — | 98 | 112 | 102 | 264 | 270 | 209 |
| Elongation (%) | 380 | 230 | 480 | 250 | — | — | 210 | 200 | 390 | 210 | 410 | 400 |
| Hardness (JIS) | 73 | 66 | 74 | 65 | — | — | 72 | 73 | 63 | 80 | 81 | 69 |
| Amount of R-22 permeated (g · mm/cm$^2$ · day) | 0.026 | 0.016 | 0.021 | 0.014 | — | — | 0.032 | 0.026 | 0.009 | 0.043 | 0.034 | 1.220 |
| Smoothness of the sheet | Good | Surface slightly poor in smoothness | Good | Surface slightly poor in smoothness | Sheet formation impossible | Sheet formation impossible | — | — | — | — | — | — |

A comparison of Example 1 (dynamic vulcanization was performed) with Comparative Example 3 (dynamic vulcanization was not performed) shows that the composition of Example 1 has excellent tensile strength and improved resistance to permeation to a fluorine-containing refrigerant gas. The same can be said from a comparison of Example 3 with Comparative Example 4.

As can be seen from Comparative Examples 1 and 2, if the amount of the first rubber component exceeds the upper limit of the range specified in this invention, a uniform rubber composition cannot be obtained. In contrast, the compositions of this invention could be formed into smooth sheets, and therefore were found to have sufficient moldability.

EXAMPLES 5-9

Butyl rubber (Butyl 268 produced by Exxon Company) and all compounding chemicals were mixed on a roll in accordance with the compounding recipe for Referential Example 5 in Table 2 to prepare a rubber compound IV.

One hundred parts of epichlorohydrin rubber (GECHRON 1000, a product of Nippon Zeon Co., Ltd.), 30 parts of SRF carbon black, 30 parts of FEF carbon, 3 parts of magnesium oxide and 3 parts of sorbitan monostearate were mixed by a roll to prepare a rubber compound V.

and the total amount of the rubbers reached 100 parts under the same mixing and dynamic vulcanization conditions as indicated above). The same procedure was repeated by using the rubber compounds IV and V in the mixing ratio of Example 8 in Table 2, or the rubber compounds IV and I in the mixing ratio of Example 9 in Table 2.

Each of the rubber compositions obtained was mixed on a roll with vulcanizers for the epichlorohydrin rubber (diphenylguanidine and 2,4,6-trimercapto-s-triazine) in the amounts indicated in Table 2, and the mixture was formed into a sheet. The smoothness of the sheet and the properties of a vulcanizate prepared from the composition (by press-curing at 170° C., 30 minutes) were evaluated, and the results are shown in Table 2.

COMPARATIVE EXAMPLES 5-8 AND REFERENTIAL EXAMPLES 5-6

A rubber composition in Comparative Example 5 was prepared in the same way as in Example 5 except that the mixing ratio of the rubber compounds I and V was changed as shown in Table 2. Rubber compositions in other examples were prepared in accordance with the compounding recipes shown in Table 2. The properties of vulcanizates prepared from the compositions by presscuring at 170° C. for 30 minutes were evaluated, and the results are shown in Table 2.

TABLE 2

| Compounding recipe and test results | Example 5 | Example 6 | Example 7 | Example 8 | Example 9 | Comparative Example 5 | Comparative Example 6 | Comparative Example 7 | Comparative Example 8 | Referential Example 5 | Referential Example 6 |
|---|---|---|---|---|---|---|---|---|---|---|---|
| Compounding recipe | | | | | | | | | | | |
| Butyl rubber | | | | 50 | 30 | | | 50 | 30 | 100 | |
| Chlorinated butyl rubber | 30 | 50 | 70 | | 20 | 80 | 50 | | 20 | | |
| Epichlorohydrin rubber | 70 | 50 | 30 | 50 | 50 | 20 | 50 | 50 | 50 | | 100 |
| SRF carbon black | 30 | 30 | 30 | 30 | 30 | 30 | 30 | 30 | 30 | 30 | 30 |
| FEF carbon black | 30 | 30 | 30 | 30 | 30 | 30 | 30 | 30 | 30 | 30 | 30 |
| Zinc oxide | 1.5 | 2.5 | 3.5 | 2.5 | 2.5 | 4 | 2.5 | 2.5 | 2.5 | 5 | |
| Magnesium oxide | 2.1 | 1.5 | 0.9 | 1.5 | 1.5 | 0.6 | 1.5 | 1.5 | 1.5 | | 3 |
| Stearic acid | 0.3 | 0.5 | 0.7 | 0.5 | 0.5 | 0.8 | 0.5 | 0.5 | 0.5 | 1 | |
| Sorbitan monostearate | 2.1 | 1.5 | 0.9 | 1.5 | 1.5 | 0.6 | 1.5 | 1.5 | 1.5 | | 3 |
| p-Quinone dioxime | 0.3 | 0.5 | 0.7 | 0.5 | 0.5 | 0.8 | 0.5 | 0.5 | 0.5 | 1 | |
| 2-Mercaptobenzothiazole | 0.09 | 0.15 | 0.21 | 0.15 | 0.15 | 0.24 | 0.15 | 0.15 | 0.15 | 0.3 | |
| Diphenylguanidine | 0.21 | 0.15 | 0.09 | 0.15 | 0.15 | 0.06 | 0.15 | 0.15 | 0.15 | | 0.3 |
| 2,4,6-Trimercapto-s-triazine | 0.84 | 0.6 | 0.04 | 0.6 | 0.6 | 0.24 | 0.6 | 0.6 | 0.6 | | 1.2 |
| Sulfur | 0.03 | 0.05 | 0.07 | 0.05 | 0.05 | 0.08 | 0.05 | 0.05 | 0.05 | 0.1 | |
| Dynamic vulcanization conditions (°C.) | 160 | 160 | 160 | 160 | 160 | 160 | — | — | — | — | — |
| (min.) | 25 | 25 | 25 | 13 | 13 | 25 | — | — | — | — | — |
| Press-curing Conditions (°C.) | 170 | 170 | 170 | 170 | 170 | — | 170 | 170 | 170 | 170 | 170 |
| (min.) | 30 | 30 | 30 | 30 | 30 | — | 30 | 30 | 30 | 30 | 30 |
| Tensile test | | | | | | | | | | | |
| Tensile strength (kg/cm$^2$) | 105 | 102 | 84 | 80 | 90 | — | 65 | 60 | 59 | 79 | 124 |
| Elongation (%) | 360 | 380 | 290 | 390 | 370 | — | 320 | 350 | 340 | 480 | 340 |
| Hardness (JIS) | 66 | 64 | 63 | 63 | 63 | — | 62 | 62 | 63 | 59 | 68 |
| Amount of R-22 permeated (g · mm/cm$^2$ · day) | 0.044 | 0.028 | 0.019 | 0.030 | 0.030 | — | 0.036 | 0.038 | 0.037 | 0.012 | 0.066 |
| Smoothness of the sheet | Good | Good | Surface slightly poor in smoothness | Good | Good | Sheet formation impossible | — | — | — | — | — |

The results given in Table 2 show that the rubber compositions of this invention have good moldability, and vulcanizates prepared from them have improved tensile strength and elongation and much higher resistance to permeation to a fluorine-containing refrigerant gas than that of a mere blend of the starting rubbers. It is also clearly seen from a comparison of Examples 1 and 3 with Comparative Examples 3 and 4 and from a comparison of Examples 6, 8 and 9 with Comparative Examples 6, 7 and 8 that the vulcanizates of the dynamically vulcanized rubber compositions of this invention have a better balance of mechanical properties such as tensile strength and elongation and resistance to permeation to a fluorine-containing refrigerant gas than the vulcanizates of rubber compositions prepared by a conventional blending technique.

We claim:

1. A rubber composition comprising 20 to 70% by weight of a first rubber component which is butyl rubber, a halogenated butyl rubber or a mixture of both as a first vulcanized rubber component and 80 to 30% by weight of a second unvulcanized rubber component which is at least one rubber selected from chlorinated polyethylene rubber, chlorosulfonated polyethylene rubber and epichlorohydron rubber, the first rubber component being dispersed as crosslinked rubber particles in the second rubber component by dynamic vulcanization or by blending the second rubber component with a powder of the crosslinked first rubber component.

2. The rubber composition of claim 1 in which the dispersed particles of the first rubber component have a particle diameter of not more than 5 microns.

3. The rubber composition of claim 1 or 2 in which the first rubber component has a gel content of at least 95%.

4. The rubber composition of claim 1 or 2 in which the first rubber component is crosslinked by dynamic vulcanization.

* * * * *